United States Patent [19]
Danielson et al.

[11] Patent Number: 5,950,679
[45] Date of Patent: Sep. 14, 1999

[54] HIGH PRESSURE PLUG COUPLING

[75] Inventors: Robert B. Danielson, Mahtomedi; Stanlee W. Meisinger, Golden Valley, both of Minn.

[73] Assignee: Fastest, Inc., St. Paul, Minn.

[21] Appl. No.: 09/021,664

[22] Filed: Feb. 10, 1998

[51] Int. Cl.⁶ ................................................. F16L 55/10
[52] U.S. Cl. ................................ 138/89; 138/90; 138/93
[58] Field of Search ................................ 138/89, 93, 90

[56] References Cited

U.S. PATENT DOCUMENTS

| | | |
|---|---|---|
| 1,554,187 | 9/1925 | Adams . |
| 1,854,674 | 4/1932 | Savon . |
| 1,995,377 | 3/1935 | Creveling . |
| 2,070,013 | 2/1937 | Krannak . |
| 2,514,911 | 7/1950 | Tatum ........................................ 138/89 |
| 2,631,872 | 3/1953 | Wurmser . |
| 2,727,759 | 12/1955 | Elliott . |
| 2,855,003 | 10/1958 | Thaxton .................................... 138/90 |
| 2,887,124 | 5/1959 | Mehl . |
| 2,937,666 | 5/1960 | Maisch ..................................... 138/89 |
| 3,029,630 | 4/1962 | Cummins .................................. 138/90 |
| 3,039,794 | 6/1962 | De Cenzo . |
| 3,234,965 | 2/1966 | Anderson . |
| 3,353,566 | 11/1967 | Cepkauskas et al. ..................... 138/89 |
| 3,435,848 | 4/1969 | Johnston . |
| 3,454,047 | 7/1969 | Johnston . |
| 3,503,637 | 3/1970 | Sosaburo Maeshiba . |
| 3,684,321 | 8/1972 | Hundhausen et al. . |
| 3,757,836 | 9/1973 | Masuda . |
| 3,778,092 | 12/1973 | Magorien . |
| 3,978,892 | 9/1976 | Scodino . |
| 3,997,196 | 12/1976 | Karcher et al. . |
| 4,394,874 | 7/1983 | Walter . |
| 4,395,051 | 7/1983 | Tonomura . |
| 4,530,485 | 7/1985 | Yonker et al. . |
| 4,543,995 | 10/1985 | Weh et al. . |
| 4,688,830 | 8/1987 | Meisinger et al. . |
| 4,716,938 | 1/1988 | Weh et al. . |
| 5,095,947 | 3/1992 | Weh et al. . |
| 5,209,528 | 5/1993 | Weh et al. . |
| 5,295,165 | 3/1994 | Hankinson ................................ 138/89 |
| 5,465,483 | 11/1995 | Fink et al. ................................ 138/89 |
| 5,575,510 | 11/1996 | Weh et al. . |
| 5,582,223 | 12/1996 | Weh et al. . |

FOREIGN PATENT DOCUMENTS

| | | |
|---|---|---|
| 34 21 496 A 1 | 12/1985 | Germany . |
| 35 18019 A 1 | 11/1986 | Germany . |
| 36 39 528 A 1 | 11/1987 | Germany . |
| 295 20 595 U1 | 3/1997 | Germany . |
| WO 89/07729 | 8/1989 | WIPO . |

Primary Examiner—James F. Hook
Attorney, Agent, or Firm—Merchant & Gould, P.C.

[57] ABSTRACT

The present invention provides a high pressure plug coupling for providing a quick, fluid tight connection to a fluid port having internal threads. The high pressure plug coupling includes a generally hollow, exterior sleeve, with a hollow cylindrical piston slideably disposed within the exterior sleeve. A split collet assembly is connected to an end of the piston and is moveable therewith relative to the exterior sleeve. The split collet assembly includes a distal end portion that is radially expandable and contractable, with an interior surface of the distal end portion being tapered. An expansion pin is moveably disposed within the collet assembly and the piston for expanding the distal end portion. The expansion pin includes a frustum-shaped end portion adjacent to the distal end portion, with the frustum-shaped end portion being engaged with the tapered interior surface when the distal end portion is radially expanded. The frustum-shaped end portion of the expansion pin acts like a wedge, forcing the collets radially outward and into engagement with the internal threads of the fluid port. Further, since the frustum-shaped end portion is engaged with the tapered surface at the radially expanded state, the force of the pressurized fluid acting on the expansion pin is distributed between the expansion pin and the collets, thus achieving a more durable design and allowing higher pressures.

20 Claims, 8 Drawing Sheets

HIGH PRESSURE PLUG COUPLING

FIELD OF THE INVENTION

The present invention relates generally to couplings for use with pressurized fluid systems. More particularly, the present invention relates to couplings having split collet designs for providing quick connections with internally threaded fluid ports.

BACKGROUND OF THE INVENTION

Quality control systems provide a significant demand for quick connect couplings. In this regard, quick connect couplings are often used to facilitate testing manufactured products for leaks. In use, the couplings provide a quick connection to test pieces such as products that hold a fluid or products designed to work under pressure or vacuum. Once the connection is made, a test fluid is communicated through the coupling to the test piece to determine if the test piece has any leaks. In order to maximize production efficiency, it is important that the couplings provide fast and reliable seals.

U.S. Pat. No. 4,716,938 to Weh et al. discloses a pressure tight plug coupling having a split collet design. The coupling includes a cylindrical housing and a piston shiftably mounted within the housing. The piston includes exterior clamping jaws that cooperate with an expansion member to move the clamping jaws radially inward or outward. The expansion member extends longitudinally through the entire length of the cylindrical housing and is connected to a rear side of the housing. The arrangement of the expansion member creates a flow path within the coupling that must be sealed by an internal sealing member.

An additional plug coupling utilizing a split collet design is disclosed in WO 89/07729. This coupling includes a housing, and a piston slideably mounted in the housing. A split collet assembly is connected to the piston for movement therewith, and the end of the split collet assembly is expanded by an expansion member extending through the split collet assembly and the piston. Expansion is caused by angled ramp surfaces on the expansion member and the end of the split collet assembly. The expansion member is connected to an actuating member, whereby the expansion member is axially shifted to permit contraction of the end of the split collet assembly. The design of the coupling is such that when the split collet assembly is expanded, the angled surfaces of the expansion member and the split collet assembly are not engaged. Therefore the entire force of the pressurized fluid acting on the expansion member is transferred axially down the expansion member.

What is needed is an improved plug coupling that has a more durable design allowing higher pressures, allows pressure to vent prior to the collets disconnecting from the fluid port, and which is simple to operate.

SUMMARY OF THE INVENTION

The present invention provides a high pressure plug coupling for providing a quick, fluid tight connection to a fluid port having internal threads. The high pressure plug coupling includes a generally hollow, exterior sleeve, with a hollow cylindrical piston slideably disposed within the exterior sleeve. A split collet assembly is connected to an end of the piston and is moveable therewith relative to the exterior sleeve. The split collet assembly includes a distal end portion that is radially expandable and contractable, with an interior surface of the distal end portion being tapered. An expansion pin is moveably disposed within the collet assembly and the piston for expanding the distal end portion. The expansion pin includes a frustum-shaped end portion adjacent to the distal end portion, with the frustum-shaped end portion being engaged with the tapered interior surface when the distal end portion is radially expanded. Actuating means are provided for actuating the expansion pin, to thereby expand and contract the distal end portion of the collet assembly.

The frustum-shaped end portion of the expansion pin acts like a wedge, forcing the collets radially outward and into engagement with the internal threads of the fluid port. Further, since the frustum-shaped end portion is engaged with the tapered surface at the radially expanded state, the force of the pressurized fluid acting on the expansion pin is distributed between the expansion pin and the collets, thus achieving a more durable design and allowing higher pressures.

A ball detent mechanism is preferably provided to ensure integral movement of the expansion pin and piston from a connected position to an activated position, and which locks the piston to the sleeve once the activated position is reached, thereby preventing further movement of the piston and allowing the expansion pin to move relative to the piston to a disconnected position. Movement of the expansion pin to the disconnected position partially disengages the frustum-shaped end portion from the tapered surface, thereby allowing the split collet assembly to radially contract. Since the piston, split collet assembly, and expansion pin move together from the connected position to the activated position, with the end of the split collet assembly remaining expanded during this period, pressure is allowed to vent from the coupling prior to the collet assembly being disconnected from the fluid port.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

DETAILED DESCRIPTION OF THE PREFERRED EMBODIMENT

Figure 1:
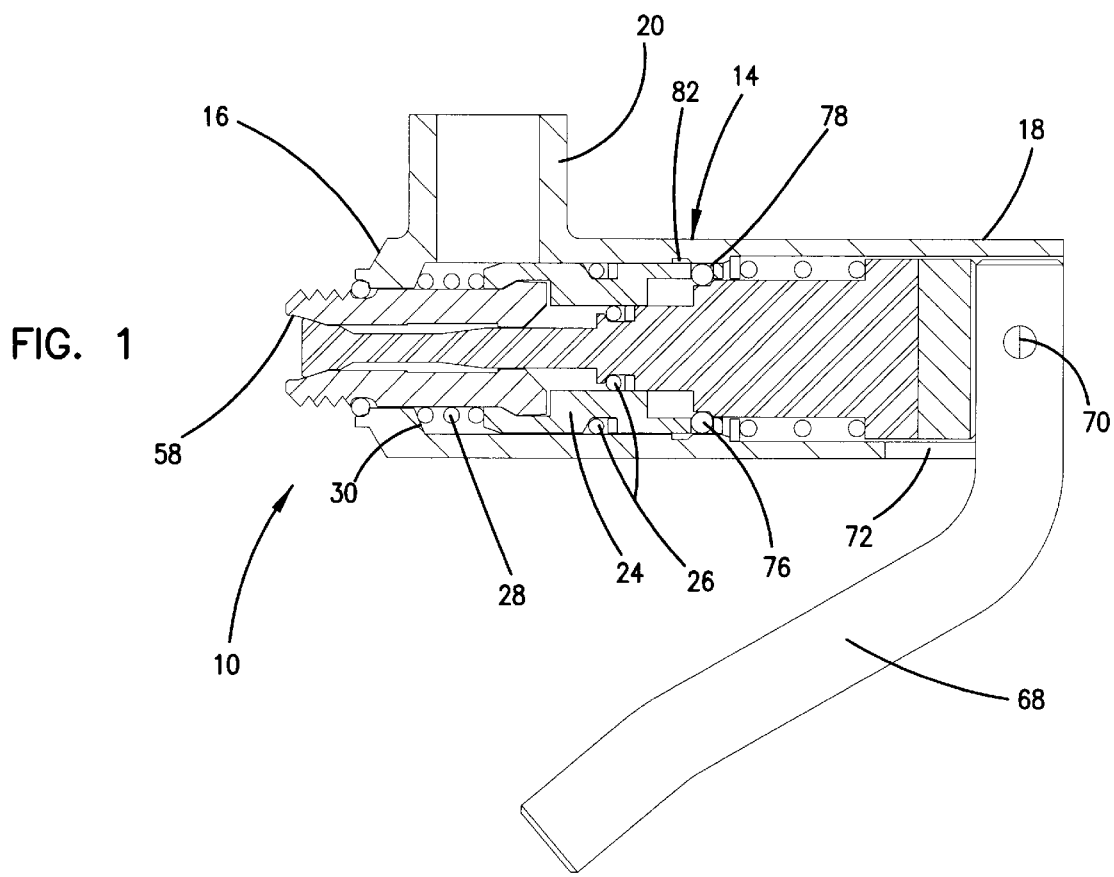
FIG. 1 shows a cross-sectional view of a high pressure plug coupling constructed in accordance with the principles of the present invention, with the coupling in a connected position.

Reference will now be made in detail to exemplary embodiments of the present invention which are illustrated in the accompanying drawings. Wherever possible, the same reference numbers will be used throughout the drawings to refer to the same or like parts.

FIGS. 1–4 show a high pressure plug coupling 10 constructed in accordance with the principles of the present invention. The coupling 10 is typically used to provide a fast, leak free connection to a high pressure, internally threaded fluid port for such purposes as pressure and vacuum leak testing, fluid filling and flushing.

The coupling 10 preferably includes a generally cylindrical, exterior sleeve 14 having first and second opposite ends 16,18, with the sleeve being generally hollow between the ends 16,18 and having a radially extending port 20 adjacent the first end 16. An annular shoulder 22 is located at the first end of the sleeve 14, the purpose of which will be later described.

Figure 2:
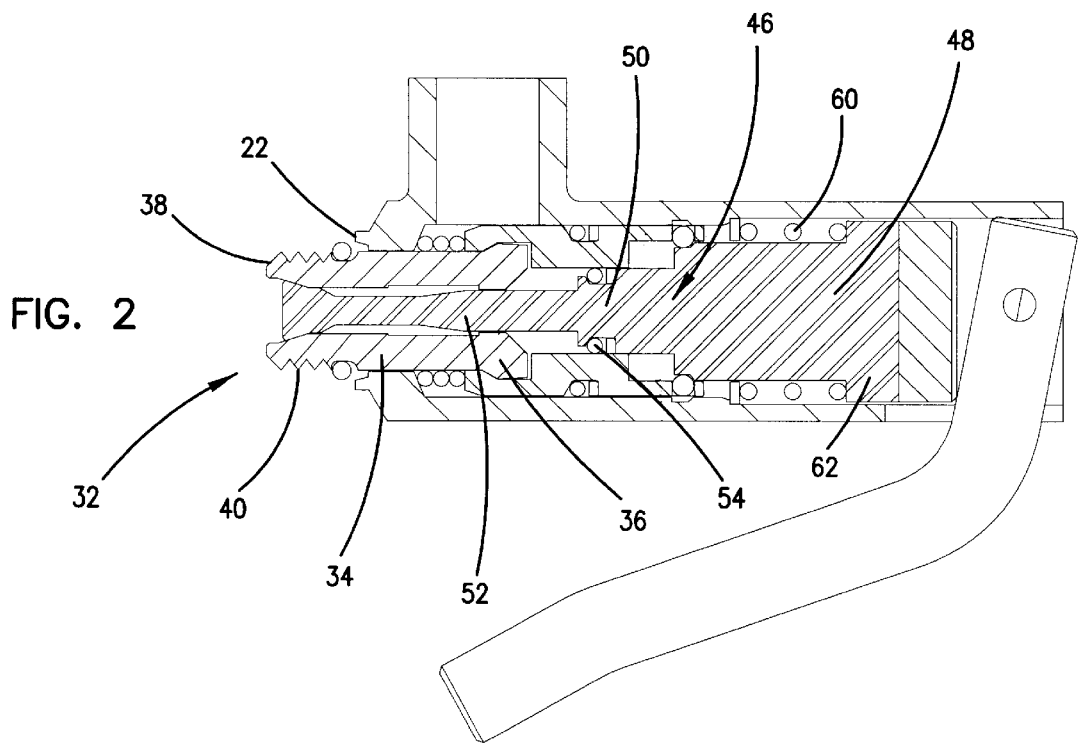
FIG. 2 is a view similar to FIG. 1, but showing the coupling in an activated position.

A piston 24 is disposed within the sleeve 14 and is slideable relative thereto between a connected position, shown in FIG. 1, and an activated position, shown in FIG. 2. The piston 24 is generally cylindrical and hollow, and an o-ring seal 26 is disposed within a circumferential recess provided in the outer circumference of the piston to prevent fluid leakage between the piston and an interior surface of the sleeve 14. The piston 24 is biased toward the connected position shown in FIG. 1 by a coiled biasing spring 28 engaged between the end of the piston 24 and a shoulder 30 formed on the interior surface of the sleeve 14.

Split collet assembly 32 is also slideably mounted within the sleeve 14 and includes one end thereof secured to the piston 24 for movement therewith between the connected and activated positions. The split collet assembly 32 is preferably constructed of a plurality of individual collet segments 34 arranged in a circumferential manner such that the split collet assembly 32 is generally cylindrical and defines a central passage. As shown in the end view of FIG. 4, there are preferably six collet segments 34, however a larger or smaller number of collet segments can be used if desired, and each of the collet segments 34 has a generally wedge shaped transverse cross-section to permit the cylindrical arrangement thereof.

One end 36 of each collet segment 34 is pivotally disposed within a groove formed in the end of the piston 24, with a distal end portion 38 of each collet segment 34 extending axially beyond the first end 16 of the sleeve 14 whereby the distal end portion of the split collet assembly is radially expandable and contractable. The exterior surfaces of the end portions 38 are preferably provided with threads 40 that are adapted to mate with internal threads formed on an interior surface of a fluid port. Proximate the threads 40, the exterior surfaces of the end portions 38 define an annular groove 42 which receives therein a main o-ring seal 44 which provides a primary seal between the fluid port and the coupling 10. The seal 44 is preferably made of an elastomeric material such as Neoprene, Urethane, Buna-N, Flourocarbon or EPR. By being disposed within the groove 42, the seal 44 is moveable with the split collet assembly 34 between the connected and activated positions, with the seal 44 being disposed against the first end 16 of the sleeve 14 at the connected position and surrounded by the shoulder 22. The shoulder 22 functions as a mechanical barrier for preventing the seal 44 from extruding.

Preferably, the seal 44 provides a biasing force by which the distal end portion of the split collet assembly can be radially contracted. In particular, with reference to FIG. 3, the distal end of the split collet assembly 32 is illustrated in the radially contracted position. In this position, the seal 44 is generally in a normal unstretched state within the groove 42, thereby providing little or no biasing force to the collet segments. As the distal end is radially expanded, as shown in FIGS. 1 and 2, the seal 44 is also expanded or stretched, thereby generating a radial contraction force within the seal which acts on the end portions 38 to bias or contract the distal end when the radial expansion force is removed.

Figure 3:
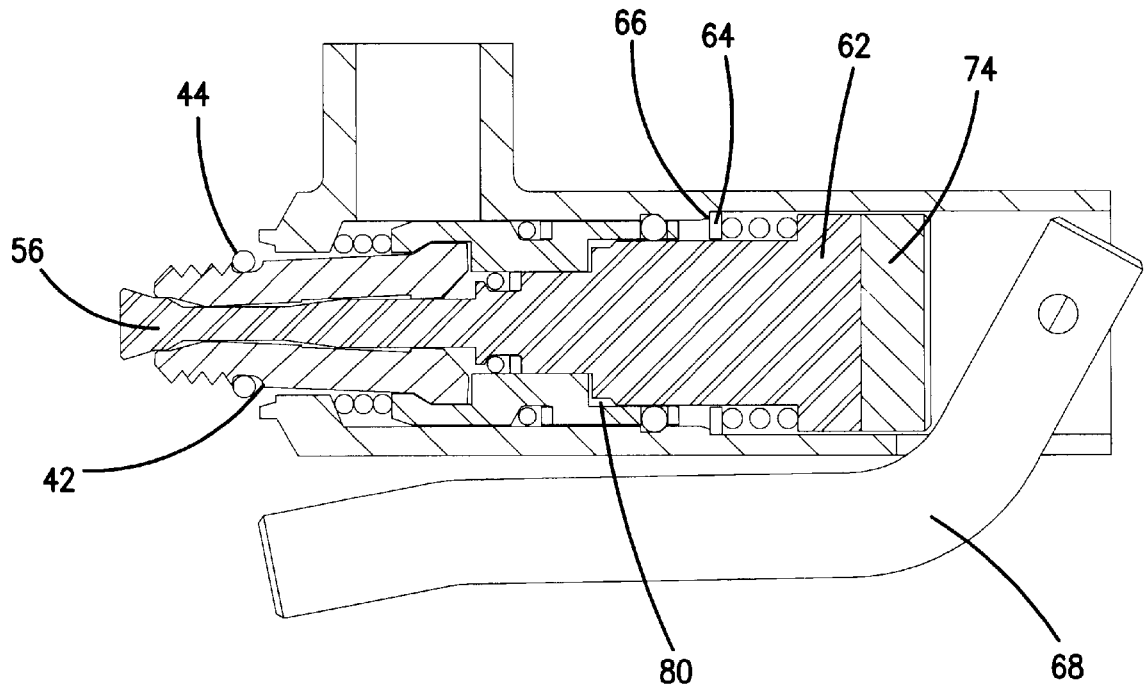
FIG. 3 is a view similar to FIG. 1, but showing the coupling in a disconnected position.
Figure 4:
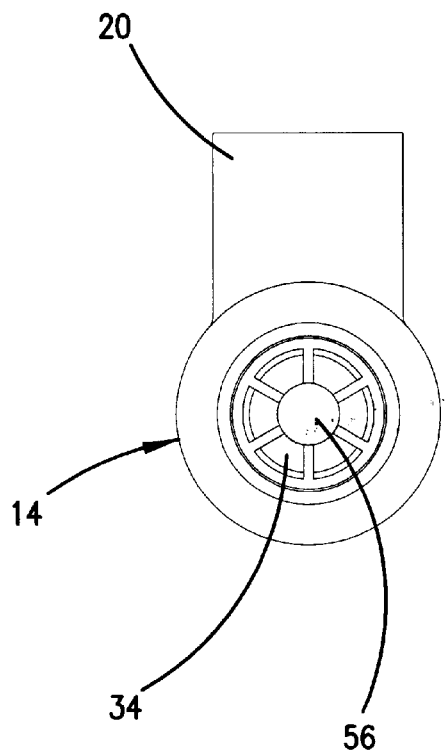
FIG. 4 is an end view of the coupling in FIG. 1 showing the split collet arrangement.

An expansion pin 46 is disposed within the sleeve 14 and extends through the piston 24 and through the split collet assembly 32 for providing a radial expansion force to the distal end of the split collet assembly 32, as well as to permit radial contraction of the distal end. With reference to FIGS. 1–3, it can be seen that the expansion pin 46 is moveable with the piston 24 from the connected position to the activated position and is moveable relative to the piston from the activated position to the disconnected position, with the distal end of the collet assembly being in the expanded state from the connected position to the activated position and being contracted at the disconnected position.

The expansion pin 46 preferably includes an enlarged end portion 48 disposed within the sleeve 14 and the piston 24, an intermediate portion 50, and a shaft portion 52. An o-ring seal 54 is disposed in a groove formed in the outer circumference of the intermediate portion 50 for sealing engagement with the inner surface of the piston 24 in order to prevent fluid flow between the intermediate portion and the piston. The shaft portion 52 includes a frustum-shaped end 56 adjacent the distal end portion of the split collet assembly 32. The interior surfaces of the distal end portions 38 of the segments 34 include ramp portions 58 that are adapted for engagement with the frustum-shaped end 56, such that when the end 56 engages the ramp portions 58, the distal end of the collet assembly is expanded radially outward, and when the end 56 is disengaged from the ramp portions, the distal end of the collet assembly is permitted to contract radially inward due to the biasing force of the o-ring seal 44.

Preferably the frustum-shaped end 56 is in contact with the ramp portions 58 at the connected position. Thus, the frustum-shaped end acts like a wedge, forcing the end portion 38 radially outward and into engagement with the threads of the fluid port. Further, due to the contact between the frustum-shaped end and the ramp portions, a force of the pressurized fluid acting on the frustum-shaped end 56 (forcing the end 56 to the right in FIG. 1) is distributed between the expansion pin 46 and the collet segments 34, thereby achieving a more durable design and allowing higher pressures. Preferably, fluid communication between the fluid port and radial port 20 is provided by gaps that are formed between the collet segments 34 in the expanded state, as well as a space formed between the collet segments and a reduced diameter portion of the shaft portion 52. In addition, since the piston, split collet assembly, and expansion pin move together from the connected position to the activated position, with the end of the split collet assembly remaining expanded during this period, pressure is allowed to vent from the coupling prior to the collet assembly being disconnected from the fluid port.

The expansion pin 46 is preferably biased toward the connected position thereof by a coil spring 60 that is engaged between a shoulder 62 formed on the enlarged end portion 48 and a washer 64 which abuts a shoulder 66 on the interior surface of the sleeve 14. The biasing force provided by the spring 28 is preferably greater than the biasing force provided by the spring 60, with each spring 28,60 cooperating to bias the components of the coupling 10 to the connected position (FIG. 1).

In order to actuate the expansion pin 46, an actuating member 68 is pivotally attached to the sleeve 14 adjacent the second end 18 thereof. One end of the actuating member 68 is disposed with the sleeve, where it is pivotally mounted on a pin 70, and the actuating member 68 extends through a cut-out portion 72 in the sleeve to the exterior of the sleeve. The cut-out portion 72 is sized to permit unrestricted pivoting of the actuating member 68 between the connected and disconnected positions, as seen in FIGS. 1–3. A spacer block 74 is fastened to the end of the expansion pin 46 adjacent the end of the actuating member 68, such that the actuating member engages the spacer block 74 when the actuating member is pivoted, thereby forcing the expansion pin 46 in an axial direction. In this manner, pivoting movements of the actuating member 68 from the position shown in FIG. 1 to the position shown in FIG. 3 causes axial movement of the expansion pin 46 from the connected position to the disconnected position. The spacer block 74 is preferably made of a lubrous material, such as plastic, in order to permit sliding movement between the end of the pivoting actuating member 68 and the end of the expansion pin 46.

As stated previously, the piston 24, collet assembly 32, and expansion pin 46 move in unison from the connected position to the activated position, and the expansion pin 46 moves relative to the piston and collet assembly from the activated position to the disconnected position. In order to accomplish such movements, a ball detent means is provided. The detent means includes at least one detent ball 76 disposed within a detent hole 78 in an end of the piston 24. Preferably, two circumferentially spaced detent balls 76 are used, with each detent ball being disposed with a respective detent hole in the end of the piston, as is shown in FIGS. 1–3. However, it should be realized that more than two detents balls can be used if desired. The enlarged portion 48 of the expansion pin 46 includes a circumferential recess 80 at one end thereof which engages the detent balls 76 from the connected position to the activated position so that the expansion pin 46 moves with the piston 24. The detent means further includes a circumferential detent groove 82 formed on the interior surface of the sleeve 14, with the groove 82 being sized to receive the detent balls 76 at the activated position and thereby lock the piston 24 to the sleeve 14.

The ball detent means operates as follows. From the connected position shown in FIG. 1 to the activated position shown in FIG. 2, the detent means ensures that axial movement of the expansion pin 46 causes corresponding axial movement of the piston 24, due to the engagement between the detent balls 76 and the recess 80. During this period, the detent balls 76 cannot move radially outward due to contact with the inner surface of the sleeve 14, and therefore the expansion pin and the piston are forced to move together to the activated position. Once the activated position is reached, the detent balls 76 are forced into the detent groove 82, thereby locking the piston to the sleeve while permitting further axial movement of the expansion pin relative to the piston to allow disconnection from the fluid port.

In operation, assuming that the coupling 10 is initially connected to a fluid port, disconnection is achieved by actuating the pivoting actuating member from the position shown in FIG. 1 to the position shown in FIG. 2, which moves the expansion pin, piston and collet assembly from the connected position to the activated position. This movement compresses both the springs 28,60, and moves the seal 44 from engagement with the sleeve, thereby breaking the seal and allowing pressure to vent from the coupling prior to the collet assembly being disconnected from the fluid port. Once the activated position is reached, the detent balls are forced into the detent groove 82, thereby locking the piston to the sleeve. Further pivoting movement of the actuating member to the disconnected position moves the expansion pin to the disconnected position against the bias of the spring 60 only, thereby removing the frustum-shaped end from engagement with the ramp portions to allow the end of the collet assembly to be radially contracted by the o-ring seal. The end portion can then be removed from the fluid port due to its contracted state. When the actuating member is released, the biasing springs 28,60 bias the expansion pin, piston and split collet assembly back to the connected position.

Figure 5:
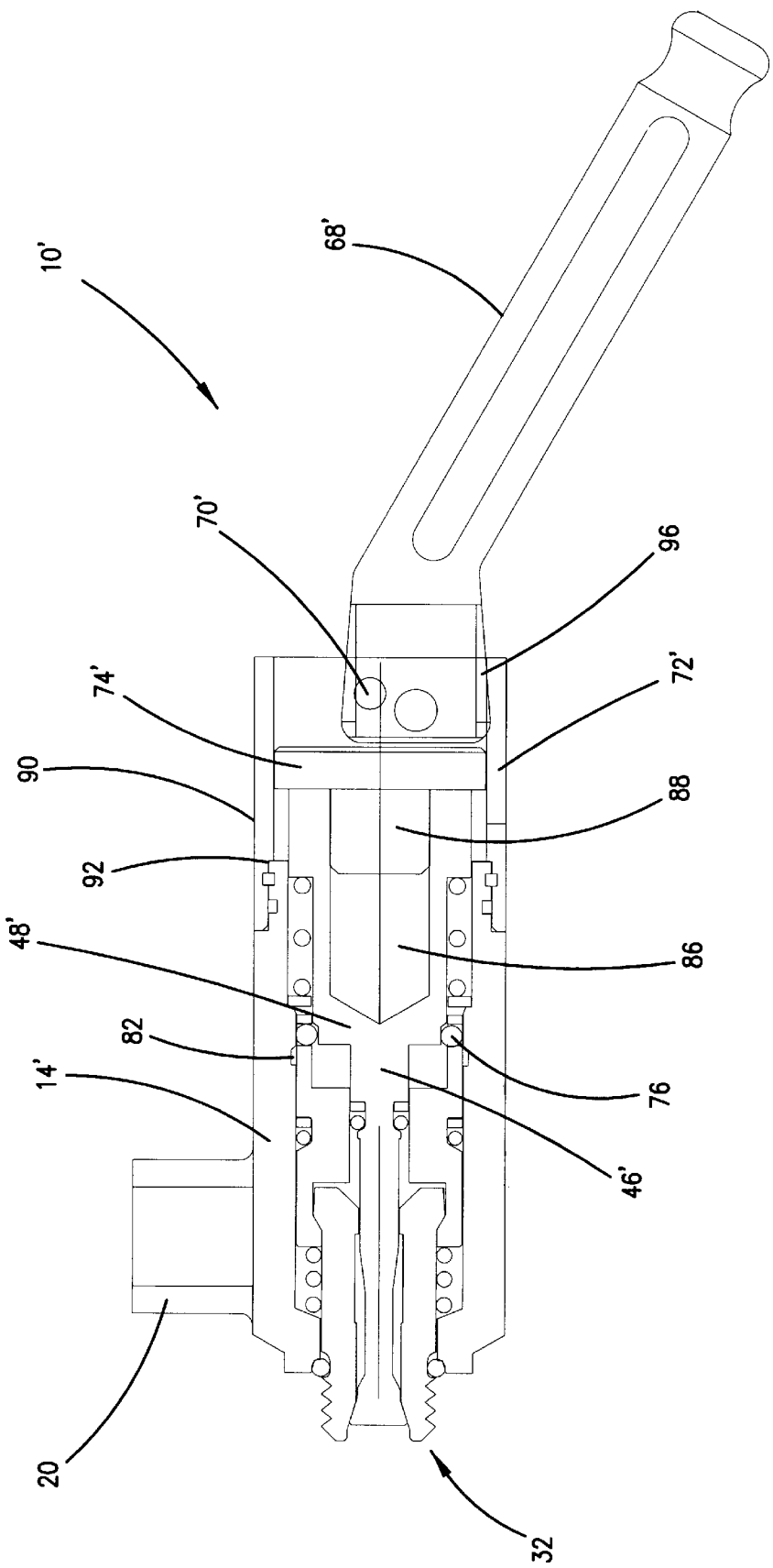
FIG. 5 is a cross-sectional view of an alternate high pressure plug coupling, with the coupling in a connected position.
Figure 6:
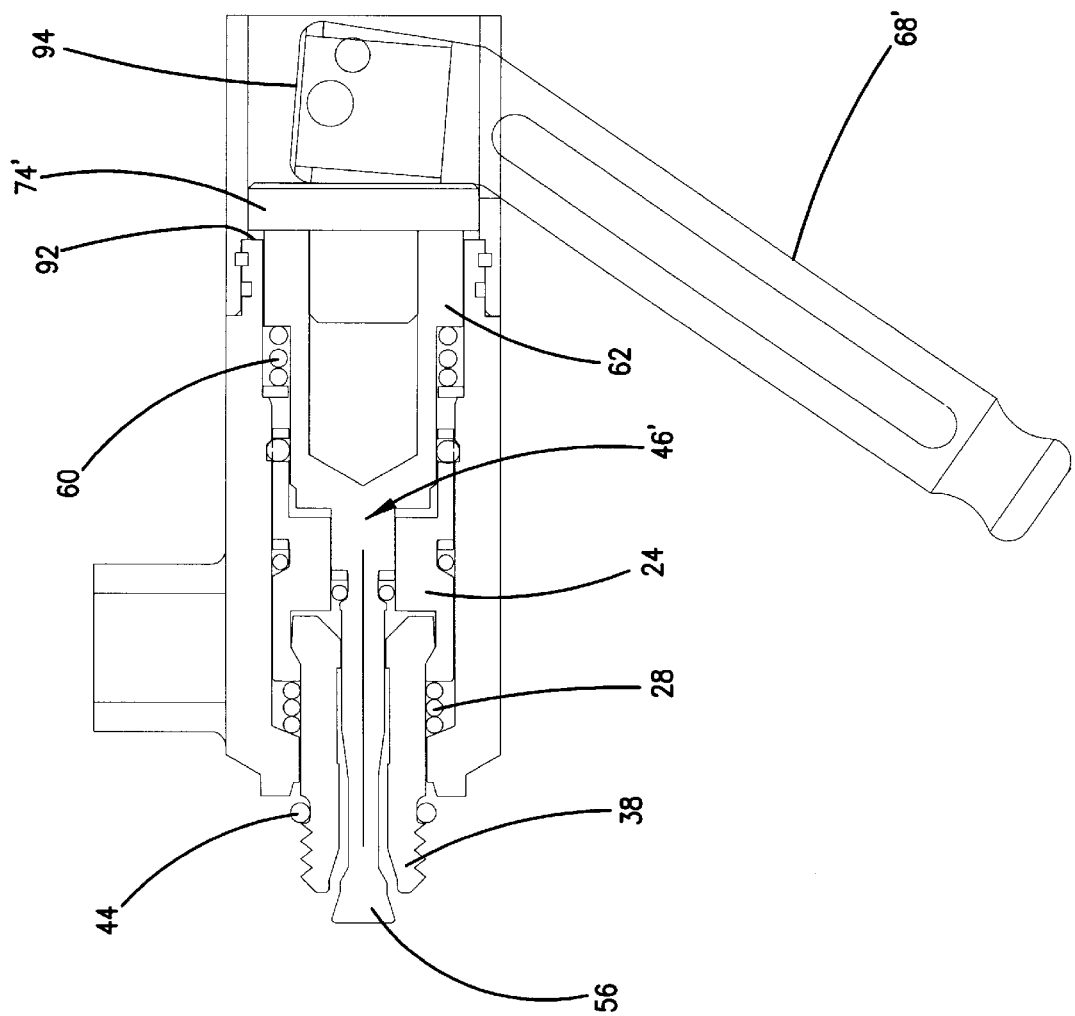
FIG. 6 is a view similar to FIG. 5, but with the coupling in a disconnected position.

With reference now to FIGS. 5 and 6, a high pressure plug coupling 10' is illustrated which is similar to the plug coupling of FIGS. 1–4. However, the enlarged end portion 48' of the expansion pin 46' includes a central bore 86 extending into one end thereof. The spacer block 74' includes a central plug 88 that fits into the bore 86, to thereby prevent pivoting or tipping of the spacer block 74' upon actuation of the pivoting actuation member 68'. The bore 86 and plug 88 arrangement thus stabilizes the spacer block 74' to maintain the block 74' in contact with the end of the expansion pin 46'.

Further, unlike the actuation member 68 which relies upon a squeezing effect thereof to actuate the expansion pin, the actuation member 68' is constructed such that cam surfaces of the actuation member 68' engage the spacer block 74' to cause movement of the expansion pin 46. As shown in FIGS. 5–6, the actuation member 68' is eccentrically mounted upon pin 70', with the pin being located slightly above the central axis of the sleeve 14'. The second end of the sleeve 14' is extended by an extension piece 90 which includes a cut-out portion 72', with a shoulder 92 being formed between the second end of the sleeve and the extension piece. The spacer block 74' is slideably disposed within the extension piece 90, with the shoulder 92 forming a stop to limit the forward movement of the spacer block. Thus, at the connected position of the coupling 10' shown in FIG. 5, a first surface 94 of the actuation member 68' abuts against the spacer block. As the actuation member 68' is pivoted to the position shown in FIG. 6, the expansion pin 46 is forced to the disconnected position due to the eccentric mounting of the actuation member on the pin 70', until the surface 96 contacts the spacer block 74'. The expansion pin 46' is held at the disconnected position by the actuation member 68', so that the actuation member 68' must be grasped and pivoted back to the position shown in FIG. 5 to permit movement of the elements back to the connected position. Thus, unlike the actuation member 68 which is squeezed and must be held to maintain the expansion pin at the disconnected position, the actuation member 68' is constructed to allow the member 68' to be released from the user's grasp while maintaining the expansion pin at the disconnected position.

Figure 7:
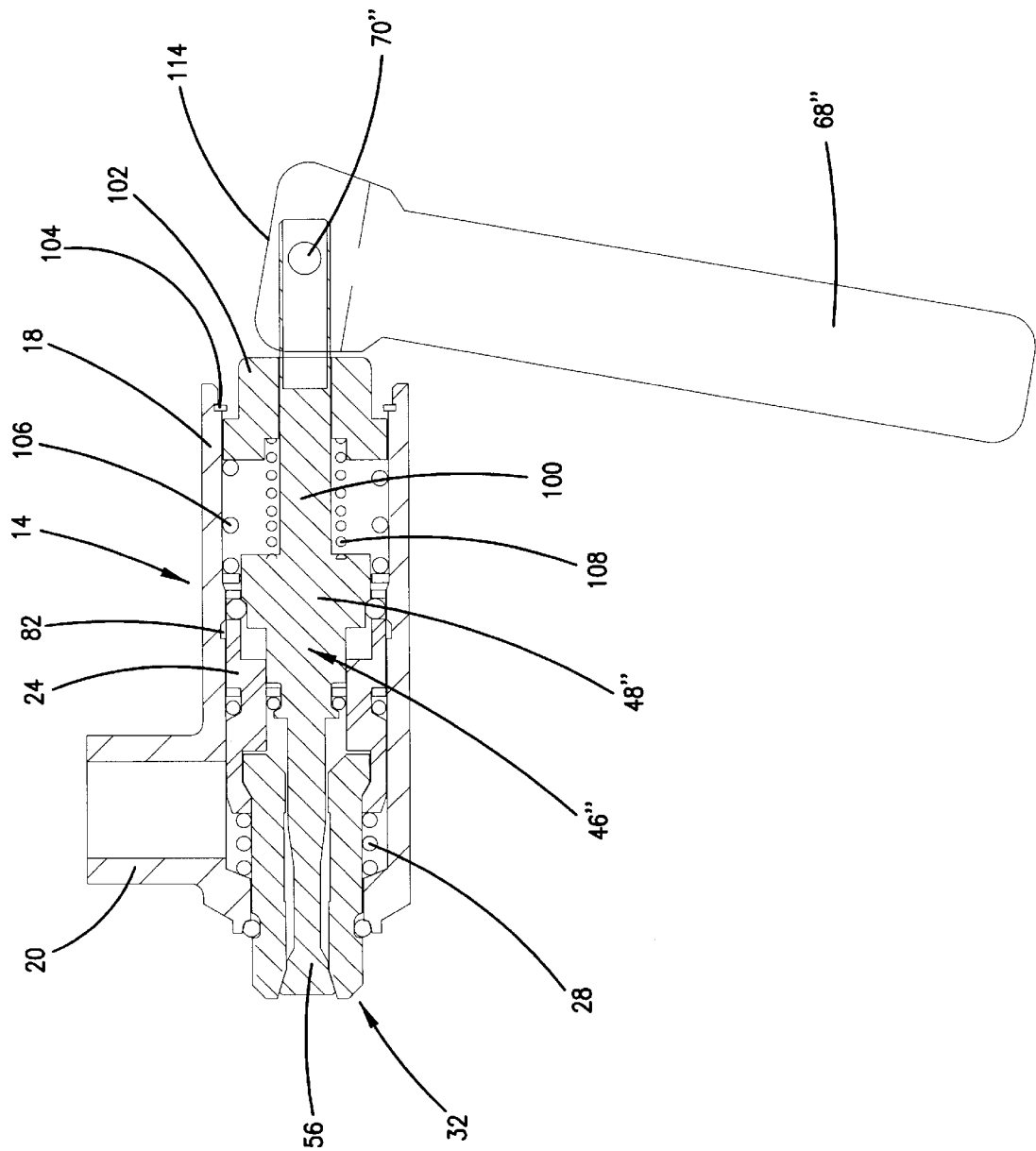
FIG. 7 is a cross-sectional view of yet another alternate high pressure plug coupling, with the coupling in a connected position.
Figure 8:
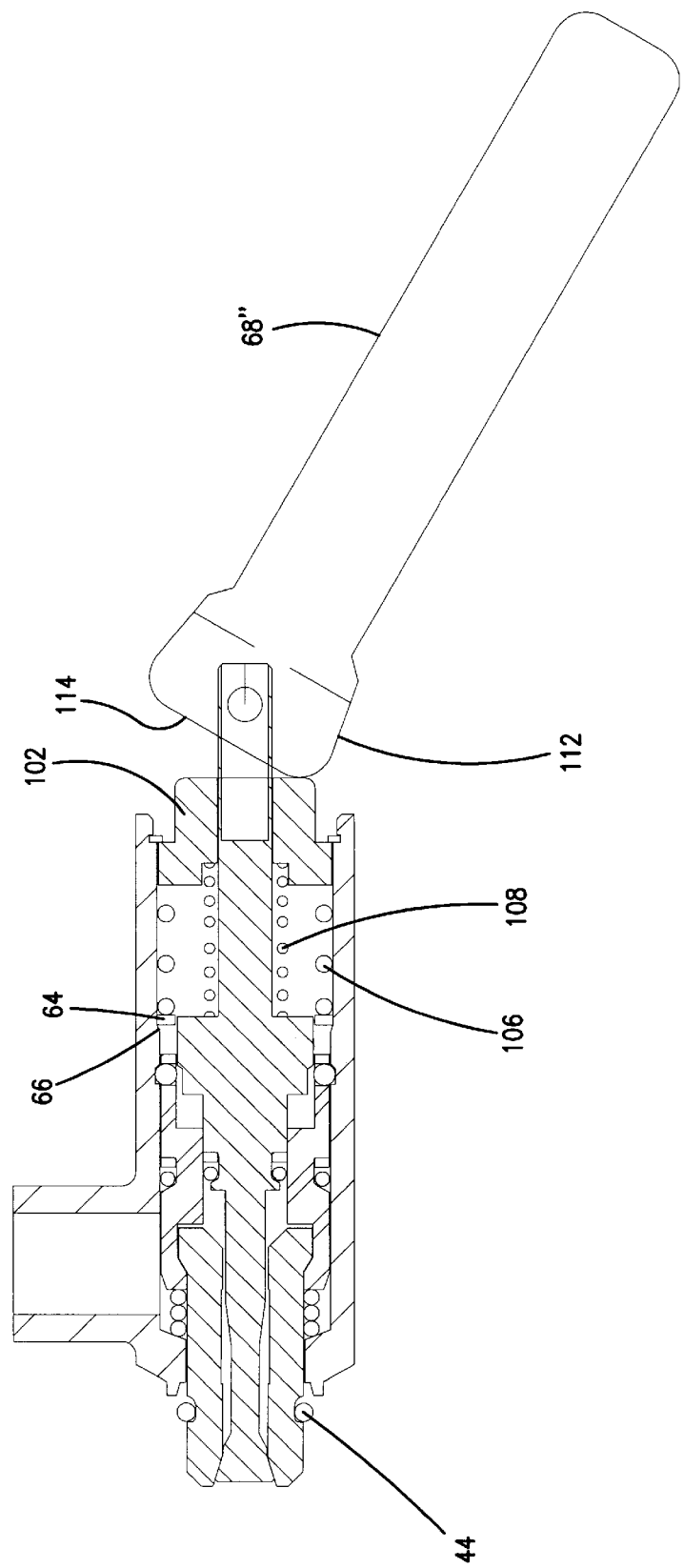
FIG. 8 is a view similar to FIG. 7, but with the coupling in an activated position.
Figure 9:
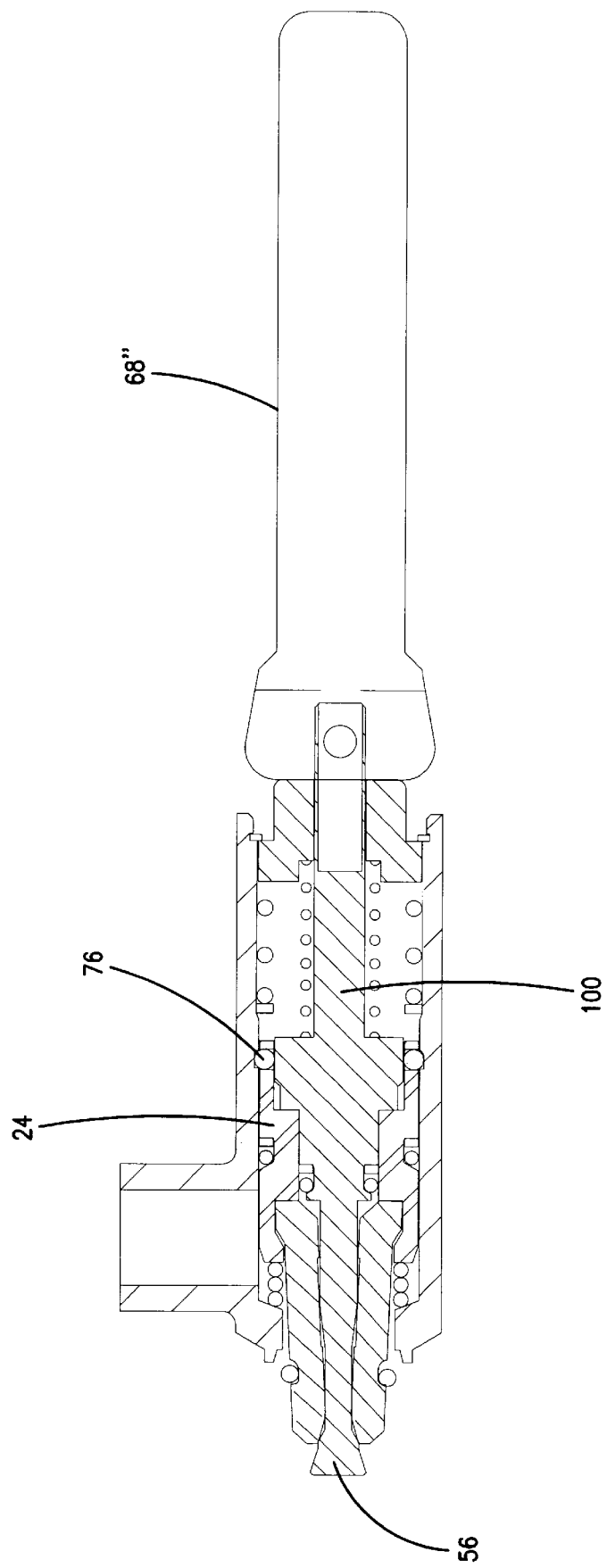
FIG. 9 is a view similar to FIG. 7, but with the coupling in a disconnected position.

The plug coupling 10" illustrated in FIGS. 7–9 provides a positive clamping force arrangement to maintain the elements of the coupling at the connected position. The enlarged portion 48" of the expansion pin 46" is generally shorter than the enlarged portion of the first embodiment, and includes a cylindrical extension 100 extending from the enlarged portion and out the second end 18 of the sleeve 14. An end cap 102 is slideably disposed within the sleeve adjacent the second end 18, with the extension 100 extending through a central passage in the end cap 102. A retaining ring 104 retains the end cap 102 within the sleeve 14, and a coil spring 106 is engaged between the washer 64 and the end cap 102 in order to bias the end cap toward the retaining ring. An additional coil spring 108 is disposed around the extension between the enlarged portion 48" and the end cap 102 to bias the expansion pin 46" toward the disconnected position. The biasing force of the spring 108 is preferably greater than the biasing force of the spring 28 which biases the piston 24 toward the connected position. Further, the biasing force of the spring 106 is relatively large, compared to the biasing force of the spring 108, to provide a positive clamping force to the actuation member 68".

The actuation member 68" is preferably in the form of a handle that is pivotally connected to the extension 100 by pin 70". The actuation member 68" is preferably constructed so as to provided a positive clamping force to retain the coupling at the connected position, with the actuation member 68" being pivoted from its clamping position at the connected position of the coupling to permit disconnection. The actuation member 68" includes a head end having a clamping surface 112 and a release surface 114. As is clear from FIGS. 7–9, the distance between the pin 70" and the clamping surface 112 is greater than the distance between the pin 70" and the release surface 114, thereby controlling movement of the expansion pin 46" based upon the position of the actuation member 68".

Starting from an initial connected position of the expansion pin, shown in FIG. 7, the actuation member 68" is in the clamped position, with the clamping surface 112 engaged with the end cap 102. Due to the large distance between the pin 70" and the surface 112, the expansion pin 46" is pulled to the right, against the bias of the spring 108, to the connected position, with the spring 28 further moving the piston to the connected position. In this connected position, the end cap 102 is slightly displaced from the retaining ring 104, with the relatively heavy biasing force of the spring 106 biasing the end cap into engagement with the surface 112, and thereby positively maintaining the actuation member 68" at this position, and preventing movement from the connected position. Disconnection is achieved by pivoting the actuation member 68" counterclockwise to the position shown in FIG. 8. At this point, the distance between the pin 70" and the surface that is engaged with the end cap is less than the distance between the pin 70" and the surface 112, and therefore the spring 108 forces the expansion pin 46" and piston 24 to the activated position, due to the detent balls 76 as in the first embodiment. During this stage of movement, the spring 106 forces the end cap 102 into engagement with the retaining ring 104. As in the two previous embodiments, the detents balls 76 extend into the detent groove 82 at the activated position, to thereby prevent further movement of the piston toward the disconnected position. Further movement of the actuation member 68" to the position shown in FIG. 9 allows the spring 108 to bias the expansion pin 46" to the disconnected position, relative to the piston 24, thereby allowing the collets to contract.

Therefore, unlike the second embodiment where the actuation member 68' is configured to retain the coupling at the disconnected position, the actuation member 68" is configured to provide a positive clamping force in order to maintain the connected position, with the positive clamping force being released to permit disconnection.

Figure 10:
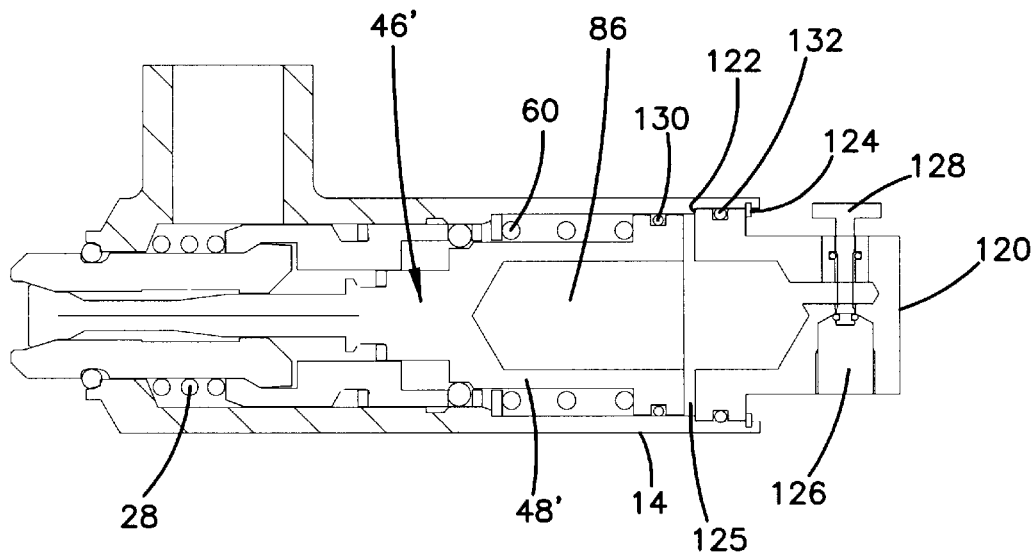
FIG. 10 is a cross-sectional view of yet another high pressure plug coupling using a pneumatic actuator.

Yet another embodiment of a high pressure plug coupling is illustrated in FIG. 10, but instead of using a pivoting actuating member, pneumatic actuation is used. As shown in FIG. 10, the enlarged end portion 48' of the expansion pin 46' preferably includes a central bore 86, as in the embodiment shown in FIG. 5. However, the bore 86 could be eliminated so that the enlarged end portion 48' is instead completely solid, if desired. A cap 120 is secured within the second end of the sleeve 14 between a shoulder 122 and a snap ring 124 for closing off the bore 86, thereby forming a pressure chamber into which pressurized fluid is input. The front of the cap 120 is spaced from the end of the enlarged end portion 48' forming a gap 125 therebetween, thereby increasing the surface area of the expansion pin 46' that the pressurized fluid acts on. The cap 120 includes a flow passage 126 therethrough, with flow through the passage 122 being controlled by a push button valve 128. The enlarged end portion 48' of the expansion pin and the cap 120 are each sealed relative to the sleeve 14 by respective o-ring seals 130,132, to prevent escape of pressurized fluid from the pressure chamber.

When a source of pressurized fluid is connected to the flow passage 126 of the cap 120, and the push button valve 128 is pressed inward, pressurized fluid flows into the pressure chamber and acts on the end of the expansion pin, thereby forcing the expansion pin to the left, toward the disconnected position to thereby permit disconnection or connection. When the push button valve 128 is released, it closes off the flow passage 126, thereby maintaining the pressure chamber under pressure and thus retaining the expansion pin in position. In order to allow the expansion pin to move back to the connected position, the pressure must be released from the pressure chamber, such as by disconnecting the source of pressurized fluid and opening the valve 128. Once the pressure is released, the biasing springs 28,60 force the elements of the coupling back to the connected position, in the manner described above with respect to the embodiment of FIGS. 1–3.

Figure 11:
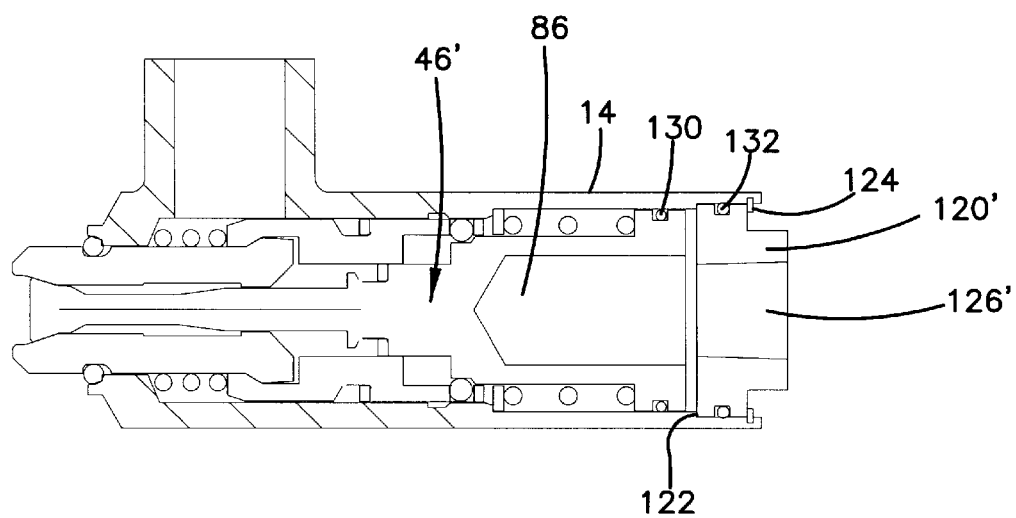
FIG. 11 is a cross-sectional view of another high pressure plug coupling using another pneumatic actuator.

An alternate embodiment of a pneumatic actuator is illustrated in FIG. 11, which utilizes a sleeve-like cap 120' that is secured in the end of the sleeve 14, with a straight through flow passage 126'. The use of a valve controlling flow through the passage 126' is therefore eliminated. The embodiment of FIG. 11 is otherwise similar to FIG. 10. By introducing pressurized fluid into the passage 126', the expansion pin is forced to the left toward the disconnected position. Once the pressure is removed, the biasing springs force the elements of the coupling to the right, back to the connected position.

It is to be understood that while certain embodiments of the present invention have been illustrated and described, the invention is not limited to the specific forms or arrangements of the parts described and shown.

We claim:

1. A high pressure plug coupling, comprising:
    a generally hollow, exterior sleeve;
    a hollow cylindrical piston slideably disposed within said exterior sleeve;
    a split collet assembly connected to said piston and moveable therewith relative to the exterior sleeve, said split collet assembly including a distal end portion that is radially expandable and contractable, and an interior surface of said distal end portion being tapered;

an expansion pin moveably disposed within the collet assembly and the piston for expanding the distal end portion, said expansion pin including an end portion adjacent to said distal end portion, said end portion being engaged with said tapered interior surface when said distal end portion is radially expanded; and actuating means for actuating said expansion pin.

2. The high pressure plug coupling according to claim 1, wherein the end portion of the expansion pin is frustum-shaped.

3. The high pressure plug coupling according to claim 2, wherein at least a portion of said frustum-shaped end portion is extendable axially beyond the distal end portion of the split collet assembly whereby said distal end portion can be radially contracted.

4. The high pressure plug coupling according to claim 1, further including detent means for ensuring integral movement of the piston and the expansion pin between a connected position and an activated position and permitting movement of the expansion pin relative to the piston from the activated position to a disconnected position, said distal end portion is radially contracted when the expansion pin is at the disconnected position.

5. The high pressure plug coupling according to claim 4, wherein said expansion pin includes an enlarged portion, and said detent means comprises at least one detent ball disposed within a detent hole in an end of said piston, and said enlarged portion being in engagement with said detent ball between the connected and activated positions.

6. The high pressure plug coupling according to claim 5, further including a circumferential detent groove formed on an interior surface of said sleeve, said detent ball being disposed within said detent groove at the activated position of the piston whereby further movement of the piston toward the disconnected position is prevented.

7. A high pressure plug coupling, comprising:

an exterior sleeve including a first end opposite from a second end, said exterior sleeve being generally hollow;

a hollow cylindrical piston slideably disposed within said exterior sleeve, said piston being slideable relative to said exterior sleeve between a connected position and an activated position;

a split collet assembly connected to said piston and moveable therewith relative to the exterior sleeve between the connected position and the activated position, said split collet assembly including a distal end portion extending outward from the first end of the sleeve and having a tapered interior surface, and the distal end portion of said split collet assembly further being radially expandable and contractable;

an expansion pin disposed within the collet assembly and the piston, said expansion pin including an end portion adjacent to the distal end portion of said split collet assembly; said expansion pin being operatively engaged with said piston so as to be moveable with said piston and said split collet assembly between the connected position and the activated position and to be moveable relative to said piston and said split collet assembly between the activated position and a disconnected position; said end portion of the expansion pin being engaged with the tapered interior surface as said expansion pin moves between the connected and activated positions, and said end portion of the expansion pin being at least partially disengaged from the tapered interior surface when the expansion pin is at the disconnected position; and actuating means adjacent the second end of the sleeve, said actuating means being operatively engaged with said expansion pin to cause movement of said expansion pin from the connected position to the disconnected position.

8. The high pressure plug coupling according to claim 7, wherein the end portion of the expansion pin is frustum-shaped.

9. The high pressure plug coupling according to claim 8, wherein at least a portion of said frustum-shaped end portion extends axially beyond the distal end portion of the split collet assembly when said expansion pin is at the disconnected position to thereby at least partially disengage said frustum-shaped end portion from the tapered interior surface, whereby said distal end portion can be radially contracted.

10. The high pressure plug coupling according to claim 7, further including detent means for ensuring integral movement of the piston and the expansion pin between the connected and activated positions.

11. The high pressure plug coupling according to claim 10, wherein said expansion pin includes an enlarged portion, and said detent means comprises at least one detent ball disposed within a detent hole in an end of said piston, and said enlarged portion being in engagement with said detent ball between the connected and activated positions.

12. The high pressure plug coupling according to claim 11, further including a circumferential detent groove formed on an interior surface of said sleeve, said detent ball being disposed within said detent groove at the activated position of the piston whereby further movement of the piston toward the disconnected position is prevented.

13. The high pressure plug coupling according to claim 7, further comprising a first spring biasing the piston toward the connected position.

14. The high pressure plug coupling according to claim 13, further comprising a second spring biasing the expansion pin toward the connected position.

15. The high pressure plug coupling according to claim 14, wherein said first spring has a first biasing force and said second spring has a second biasing force, and wherein said first biasing force is greater than said second biasing force.

16. The high pressure plug coupling according to claim 13, further comprising a second spring biasing the expansion pin toward the disconnected position.

17. The high pressure plug coupling according to claim 16, wherein said first spring has a first biasing force and said second spring has a second biasing force, and wherein said second biasing force is greater than said first biasing force.

18. The high pressure plug coupling according to claim 7, wherein said actuating means comprises a pivoting actuating member adjacent the second end of the sleeve.

19. The high pressure plug coupling according to claim 18, wherein the pivoting actuating member maintains the expansion pin at one of the disconnected and connected positions.

20. The high pressure plug coupling according to claim 7, wherein said actuating means comprises a pneumatic actuator.

* * * * *